United States Patent [19]

Hayata

[11] Patent Number: 4,934,193
[45] Date of Patent: Jun. 19, 1990

[54] PRESSURE SENSING TRANSMITTER
[75] Inventor: Koji Hayata, Shizuoka, Japan
[73] Assignee: Bailey Japan Co., Ltd., Shizuoka, Japan
[21] Appl. No.: 356,997
[22] Filed: May 25, 1989
[30] Foreign Application Priority Data May 30, 1988 [JP] Japan ................. 63-130076

[51] Int. Cl.$^5$ ........................... G01L 7/08; G01L 9/06
[52] U.S. Cl. ........................................ 73/727; 73/706; 338/4
[58] Field of Search ................. 73/727, 726, 724, 721, 73/720, 718, DIG. 4, 754, 706; 310/338; 29/621.1, 25.35; 338/4, 42

[56] References Cited
U.S. PATENT DOCUMENTS 4,502,335 3/1985 Wamstad ............................. 73/727

OTHER PUBLICATIONS

R. J. Holmes, "Changes in Thick Film Resistor Values Due to Substrate Flexure Announcement", issued Oct. 1973, published in Microelectronics and Reliability, vol. 12, No. 4.

Primary Examiner—Donald O. Woodiel
Attorney, Agent, or Firm—Frishauf, Holtz, Goodman & Woodward

[57] ABSTRACT

A pressure sensing transmitter comprises a housing, a sensor base, a ceramic sensor, thick film resistor members, an isolation diaphragm, and an isolation fluid. A sensing surface contacting with the isolation fluid is formed with a spherical surface form, the thick film resistor members are sintered on a sintering surface of an opposite side against the sensing surface projection area, and a test fluid flow is isolated from the sensing mechanism by a metal diaphragm so that a process fluid pressure is transferred indirectly to the sensing element. According to the invention, since each of the thick film resistor members 14A and 14B are sintered at both the interior and exterior of the sensing surface projection area 13C, a sintering area can be made larger than that of a conventional one, so that a larger output can be maintained without losing any characteristic of the thick film resistor member. This arrangement also provides a higher degree of precision, long life stability, as well as increased safety and reliability.

4 Claims, 3 Drawing Sheets

PRESSURE SENSING TRANSMITTER

BACKGROUND OF THE INVENTION

The present invention relates generally to a pressure sensing and transmitting device.

Conventional pressure sensing and transmitting devices employ a pressure detecting device including a metal resistor member adhered on a surface of a metal diaphragm.

In the conventional devices, it has been considered to employ a ceramic as a diaphragm material to provide a longer life. Since a ceramic material does not easily make a plastic deformation, creep does not arise, even under a long period of a stress application, and a produced strain can be maintained constantly.

Further, as a resistor member that has a high gauge strain resistance variation sensitivity against a strain, it may be considered to employ a thick film resistor member such as described in "Changes in thick film resistor values due to substrate flexure announcement" (R. J. Holmes), published in Microelectronics and Reliability, Vol. 12, No. 4, issued October, 1973.

However, since a ceramic diaphragm has a very large Young's modulus, generation of strain due to a stress is small. Therefore, in a combination of a ceramic diaphragm with a thick film resistor member, it is difficult to obtain a large output with a thick film resistor member within a safe size range so that it will not break the ceramic diaphragm.

Furthermore, in order to combine a pressure detecting device which includes a thick resistor member secured to a ceramic diaphragm to form a pressure sensing and transmitting device, it is required to include some parts such as bolts, nuts and sealing materials for fixing the ceramic diaphragm to a housing of the pressure sensing and transmitting device. As a result, a boundary condition of the ceramic diaphragm is changed over a period of time by fatigue of said fixing parts. Therefore, there is a problem that long-term stability is not possible to compensate for.

OBJECT AND SUMMARY OF THE INVENTION

It is an object of the present invention to provide a pressure sensing transmitter capable of obtaining a large output with high precision in a thick film resistor member while preventing damage to a ceramic member and to also provide such a device wherein the output can be stabilized for a long period of time.

In accordance with the present invention, a pressure sensing transmitter comprises a housing, a sensor base joined to said housing, a ceramic sensing joined to said sensor base, thick film resistor member sintered to said ceramic sensor, an isolation diaphragm joined to said housing and forming an isolation fluid sealing in space between said isolation diaphragm and a sensing surface of the ceramic sensor in order to isolate said isolation fluid sealing in space against a test fluid flow space, and an isolation fluid sealed into the isolation fluid sealing space. A sensor base has an external form of a curved line pattern increasing in its external size gradually from a side of housing junction end edge toward a ceramic sensor junction edge, the external peripheral thickness of the ceramic sensor junction edge is formed to be thin, the ceramic sensor is joined by brazing to an end surface of the ceramic sensor junction end of said sensor base, the sensing surface contacting with the isolation fluid of said ceramic sensor is formed with a spherical surface form, and the thick film resistor member is formed to be sintered on a sintering surface of the opposite side of the sensing surface contacting with the isolation fluid of the ceramic sensor.

Further, in a preferred embodiment, the ceramic sensor is made of an alumina oxide, the sensor base is made of titanium, and the junction brazing between the ceramic sensor and the sensor base is an active metal brazing alloy made of aluminum, titanium and binder.

Furthermore, the thick resistor member is provided to form a Wheatstone bridge circuit, a pair of thick film resistor members are sintered approximately at a central portion of the sensing surface projecting area on said sintering surface of the ceramic sensor, and another pair of the thick film resistor members are sintered at the external portion of sensing surface projection area on said sintering surface of the ceramic sensor.

According to one aspect of the present invention, since the sensing surface contacting with the isolation fluid of the ceramic sensor is formed with a spherical surface form, a stress produced at the ceramic sensor is dispersed with a lower value, and as a result, the mechanical strength of the ceramic sensor is improved. Therefore, with this effect, a safety rate against damage can be increased largely, and a large output can be obtained at the thick film resistor member.

According to another aspect of the present invention, since the thick film resistor member is sintered on the sintering surface opposite to the sensing surface contacting with the isolation fluid of the ceramic sensor, only a surface stress produced at the ceramic sensor is detected, and a high precision output characteristic is ensured. And, a resistance changing rate which is changed by a strain of thick film resistor member is changed in proportion to each of the stresses produced in three axial directions of the thick film resistor member. Therefore, when the thick film resistor member is directly exposed to a test pressure fluid different from the present invention, since it receives not only merely the surface stress of the ceramic sensor but also it receives the effect of the test fluid pressure, and a high precision output characteristic cannot be ensured.

According to still another aspect of the present invention, since the ceramic sensor is joined with a brazing material to the sensor base, a boundary condition of the ceramic sensor is stabilized for a long period of time, and a long period stability of the output can be ensured. At this moment, since the shape of the sensor base is an external form of a curved line pattern and the thickness of the external peripheral edge portion is made thin, a heat remaining stress produced due to said brazing to the ceramic sensor (a stress produced from the difference of the thermal expansion quantity between the ceramic sensor and the sensor base) can be decreased, and also the long period stability of the output can be ensured.

According to still another aspect of the present invention, an isolation diaphragm is provided, so that an isolation fluid sealing in space sealed to the sensing surface side of the ceramic sensor and a test fluid flow space are isolated from each other. Therefore, the ceramic sensor, sensor base, and brazing material can be protected from the over-pressure of the test fluid and a corrosive fluid, and a long-term stability of the output can be also ensured.

Further, according to the present invention, in the case where a ceramic sensor is made of an alumina oxide, a sensor base is made of titanium, and this ceramic sensor and a sensor base are joined with a junction brazing, the output of the thick film resistor member can be stabilized for a long period of time by following ⓐ and ⓑ. Specifically, ⓐ is a case wherein a material component of the sensor base is made of titanium having a thermal expansion coefficient similar to and larger than the alumina oxide which is a material component of the ceramic sensor, and a remaining thermal stress (a stress produced from a difference of the thermal expansion quantity between the ceramic sensor and the sensor base) which is produced due to said brazing to the ceramic sensor can be decreased. Case ⓑ is where an active metal brazing alloy aforementioned as a brazing material is utilized, and the brazing is carried out with a brazing temperature lower than a sintering temperature (for example, 850° C.) of the thick film resistor member, and as a result, a necessary and sufficient junction strength can be ensured without losing or imparing the characteristic of the thick film resistor member (a resistance value of origin and a resistance changing rate changed by pressure). Further, according to the above-described case ⓐ, since the stress of the ceramic sensor does not reach to its interior but it occurs only at the external periphery portion, a micro-crack on the surface of the ceramic sensor is easily found, and a breakdown of the ceramic sensor can be prevented before an accident occurs.

Furthermore, according to the present invention, since a sensing surface of the ceramic sensor is formed as a spherical shape as aforementioned, only a tensile stress occurs at a sensing surface projection area on its sintering surface. In a case where a tensile stress and a compressive stress coexist at said sensing surface projection area different from the present invention, to sinter a pair of the thick film resistor members forming a Wheatstone bridge circuit and another pair of the thick film resistor members at said corresponding sensing surface projection area is desirable to obtain a large output at a Wheatstone circuit. However, according to the present invention, since only a tensile tress exists at the sensing surface projection area as aforementioned, only a pair of the thick film resistor members are sintered at said sensing surface projection area, and another pair of the thick film resistor members are sintered at an external periphery of said sensing surface projection area. In this case, since each of the thick film resistor members are formed both at the interior and exterior of the sensing surface projection area, a sintering area of each of the thick film resistor members may be made large, and as a result, the noise generated by each thick film resistor member is less, and a signal noise ratio (SN ratio) of the output signal is high, so that a large output can be obtained.

DETAILED DESCRIPTION

Throughout the drawings, like reference symbols are used to designate like or equivalent parts or portions, for simplicity of illustration and explanation.

Figure 1:
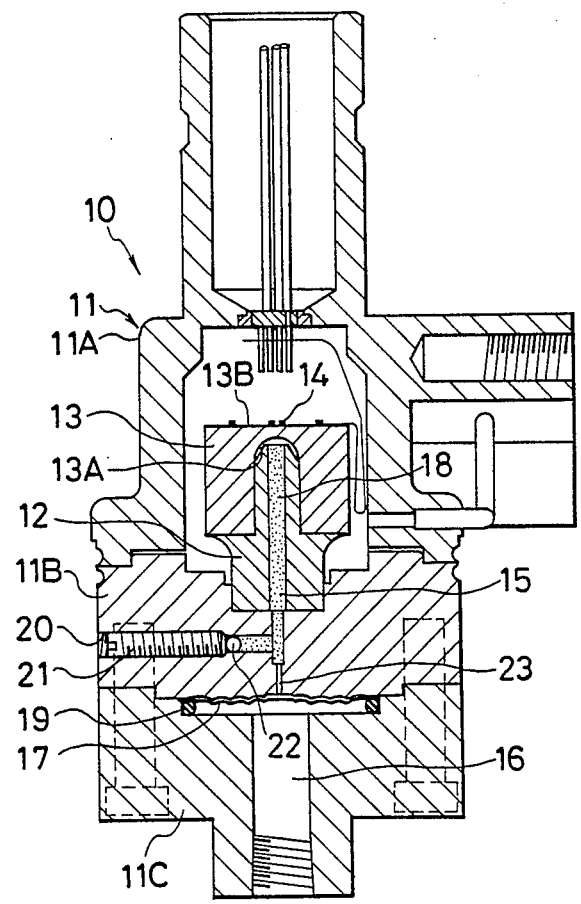
FIG. 1 is a cross-sectional view showing a pressure sensing transmitter according to a preferred embodiment of the present invention.

A pressure sensing transmitter 10 is used for detecting a pressure of a process fluid and for producing a detected result output which is possible to transmit. Pressure sensing transmitter 10, as shown in FIG. 1, comprises a metal housing 11 made of a stainless steel, a sensor base 12 joined to the housing 11, a ceramic sensor 13 joined to said sensor base 12, a thick film resistor member 14 sintered to the ceramic sensor 13 by a screen printing process or the like, and a metal isolation diaphragm 17 joined to said housing 11. An isolation fluid is sealed in space 15 between said isolation diaphragm 17 and a sensing surface 13A of the ceramic sensor 13. The isolation fluid is sealed in space 15 and is separated from a test fluid flow space 16 by means of the isolation diaphragm 17.

The housing 11 comprises a combination of three members, namely, an upper body 11A, an intermediate body 11B, and a lower body 11C. The isolation diaphragm 17 is welded to the intermediate body 11B, and an "O"-ring 19 interposed with pressure between an external periphery of the isolation diaphragm 17 and the lower body 11C.

The sealed isolation fluid space 15 is formed in both the intermediate body 11B and the sensor base 12, and an isolation fluid sealing in inlet 20 provided at the intermediate body 11B is sealed off by inserting with pressure a ball 22 pushed from behind by a screw 21. A communicating passage 23 of the isolation fluid sealing in space 15 which is provided in the intermediate body 11B and opening at one side of the isolation diaphragm 17 can be protected from breaking down.

According to the pressure sensing transmitter constructed as described above, after the isolation diaphragm 17 has received a pressure of a test fluid in space 16, and when this pressure is transmitted to the ceramic sensor 13 through the isolation fluid 18, a strain is produced on the ceramic sensor 13 by this pressure. The thick film resistor member 14 is sintered with said ceramic sensor 13, and said strain is transferred with a high strain transferring rate to the resistor member 14, because they are co-fused together so that the resistance value is changed with a high sensitivity. The pressure sensing transmitter 10 includes an electric circuit (Wheatstone bridge circuit) sensitive to the resistance varaition of said thick film resistor member 14, and its electrical output is transmitted to an exterior portion of the system.

Figure 2:
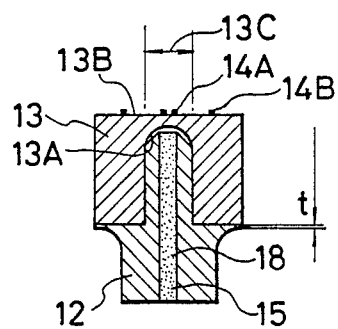
FIG. 2 is a cross-sectional view showing an assembled state of a sensor base, a ceramic sensor and a thick film resistor member.

According to pressure sensing transmitter 10, as shown in FIG. 2, the sensor base 12 has an external shape of a curved line pattern which gradually increases in its external shape dimension from the junction end side of the housing. The sensor base 12 has a relatively small thickness "t" at the junction end portion thereof where it meets the ceramic sensor.

The ceramic sensor 13 is brazed to the nd surface of the junction end portion of the sensor base 12. The sensor base 12 is brazed to the intermediate body 11B.

A sensing surface 13A for contacting with the isolation fluid 18 of the ceramic sensor is formed into a semispherical surface form.

The thick film resistor member 14 is sintered on the sintering surface 13B located opposite to the sensing surface 13A contacting with the isolation fluid 18 of the cermaic sensor 13, by a screen printing or the like. Because the printing and the sintering of this thick film resistor member 14 are different due to the presence of a thermal capacity of the ceramic sensor 13, it is desirable to braze the ceramic sensor 13 to the sensor base 12 after the thick film resistor 14 is sintered to the ceramic sensor 13.

It is most preferable that the ceramic sensor 13 is made of an alumina oxide ($Al_2O_3$), the sensor base 12 is made of titanium, and adjoining brazing material of the ceramic sensor 13 to the sensor base 12 is an active metal brazing alloy made of aluminum, titanium and a binder. The reason for this will be explained later. The active metal brazing is made such that a few percent of titanium is mixed with the aluminum base and is diluted with a binder so as to be in a paste state, and thereafter it is printed on the ceramic sensor 13 by a silk screen.

Figure 3:
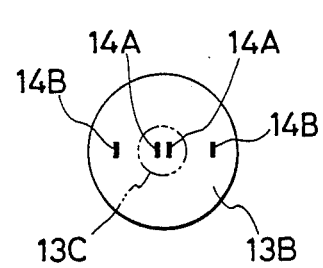
FIG. 3 is a plan view of FIG. 2.
Figure 4:
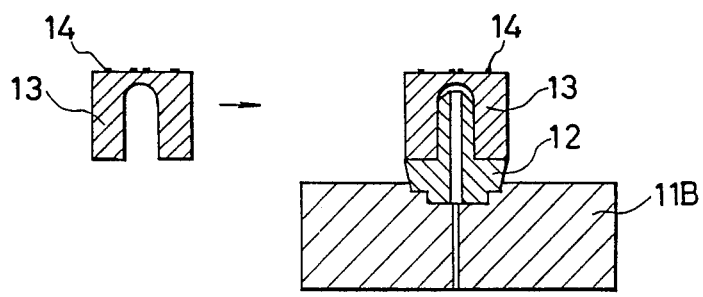
FIG. 4 is a schematic diagram showing an assembling step of the sensor base, the ceramic sensor and the thick film resistor member in turn.

It is most preferable that the thick film resistor member 14 is provided to form a Wheatstone bridge circuit, as shown in FIG. 3, wherein a pair of thick film resistor member 14A forming a part of said circuit are sintered at approximately the central portion of the sensing surface projection area 13C in said sintered surface 13 of the ceramic sensor 13, and another pair of thick film resistor members 14B are sintered at the external periphery of the sensing surface projection area 13C in said sintering surface 13B of the ceramic sensor 13. The reason for this will be described later.

Below will be explained the operation of the aforementioned embodiment.

In the present sensing transmitter 10, since the sensing surface 13A contacting with the isolation fluid 18 of the ceramic sensor 13 is formed with a semi-spherical surface, a stress occurring in the ceramic sensor 13 is dispersed with a lower value, and as a result, the mechanical strength (endurance) of the ceramic sensor 13 is improved. Therefore, a safety rate against breakdown can be made larger, and a large output can be obtained at the thick film resistor member 14. Table 1 shows the values of corresponding stresses occurring at the corresponding corner portion in a case where a radius of the corner portion of the sensing surface 13A of the ceramic sensor 13 is changed, and in which the thickness of the ceramic sensor 13 is constant. Table 2 shows the values of the corresponding stresses occurring at the corresponding corner portion in a case where the thickness of the ceramic sensor 13 is changed, and in which the corner portion of the sensing surface 13A of the ceramic senor 13 is formed constantly with a semi-sherical form. According to Tables 1 and 2, a produced stress of the ceramic sensor 13 where the sensing surface 13A is formed with a semi-spherical form is recognized as being less than that of the ceramic sensor of the flat form.

According to the present invention, since the thick film resistor member 14 is sintered on the sintering surface opposite the surface 13A contacting with the isolation fluid 18 of the ceramic sensor 13, only the surface stress occurring on the ceramic sensor 13 is detected, so that a high precision output characteristic can be ensured. Further, the resistance changing rate changed by the strain of the thick film resistor member 14 is changed in proportion to each stress occurring toward the three axial directions of the thick film resistor member 14. Accordingly, when the thick film resistor member 14 is directly exposed to the pressure fluid different from the present invention, it receives not only the surface stress of the ceramic sensor 13, but also the effect of the fluid pressure, so that a high precision output characteristic cannot be ensured.

According to the pressure sensing transmitter 10 of the present ivention, since the ceramic sensor 13 is brazed to the sensor base 12, a boundary condition of the ceramic sensor 13 is stabilized for a long period of time, so that the long-term stability of the output can be ensured. As shown in the drawings, the sensor base 12 has an external shape of a curved line form, and at the same time, the thickness of the external periphery of the junction edge of the ceramic sensor is provided thinner, the sensor base 12 is charged in its form to follow in response to the change of the ceramic sensor 13 to be brazed, a thermal remaining stress occurring in the ceramic sensor 13 due to said brazing (a stress caused by a difference of the thermal expansion quantity of the ceramic sensor 13 and the sensor base 12) can be decreased, to that the long-term stability of the output can be ensured.

According to the pressure sensing transmitter 10 of the present invention, the isolation diaphragm 17 is provided for isolating the isolation fluid 18 sealed into a side of the sensing surface 13A of the ceramic sensor 13 against the test fluid flow space. Therefore, according to this feature, the ceramic sensor 13, the sensor base 12, and the brazing material can be protected from the over-pressure of the test fluid and the corrosive fluid, so that the long-term stability of the output can be ensured. Further, when a crack is formed in ceramic sensor 13, a peeling off of the brazing portion, or a leakage of the isolation fluid occurs, the isolation diaphragm 17 can protect the flowing out of the test fluid.

According to the pressure sensing transmitter 10 of the present invention, the ceramic sensor 13 is made of an aluminum oxide, the sensor base 12 is made of titanium, and the junction brazing between the ceramic sensor 13 and the sensor base 12 is an active metal brazing alloy made of aluminum, titanium and a binder, the output of the thick film resistor member 14 can be more fully stabilized for a long time by following cases ⓐ and ⓑ, as follows. In case ⓐ, since the component material of the sensor base 12 is made of titanium having a thermal expansion coefficient similar to and a little larger than the alumina oxide which is a component material of the ceramic sensor 13, a thermal remaining stress occurring at the ceramic sensor 13 due to said brazing (a stress occurring by a difference of the thermal expansion quantity between the ceramic sensor 13 and the sensor base 12) can be decreased. In case ⓑ, since an active metal brazing alloy made of aluminum, titanium and a binder is employed as a brazing material, it can be joined with a junction temperature lower than the sintering temperture (for example, 850° C.) of the thick film resistor member, and as a result, a necessary and sufficient junction strength can be enured without losing the characteristic of the thick film resistor member 14 (a resistance variation rate changed according to the resistance value and pressure of an original term). Further in this case, according to case ⓐ, since the stress of the ceramic sensor 13 does not reach to its interior and occurs only at the exterior, a micro-crack in the surface of the ceramic sensor 13 is easily discovered, so that the breakdown of the ceramic sensor can be avoided before anything happens.

Figure 5:
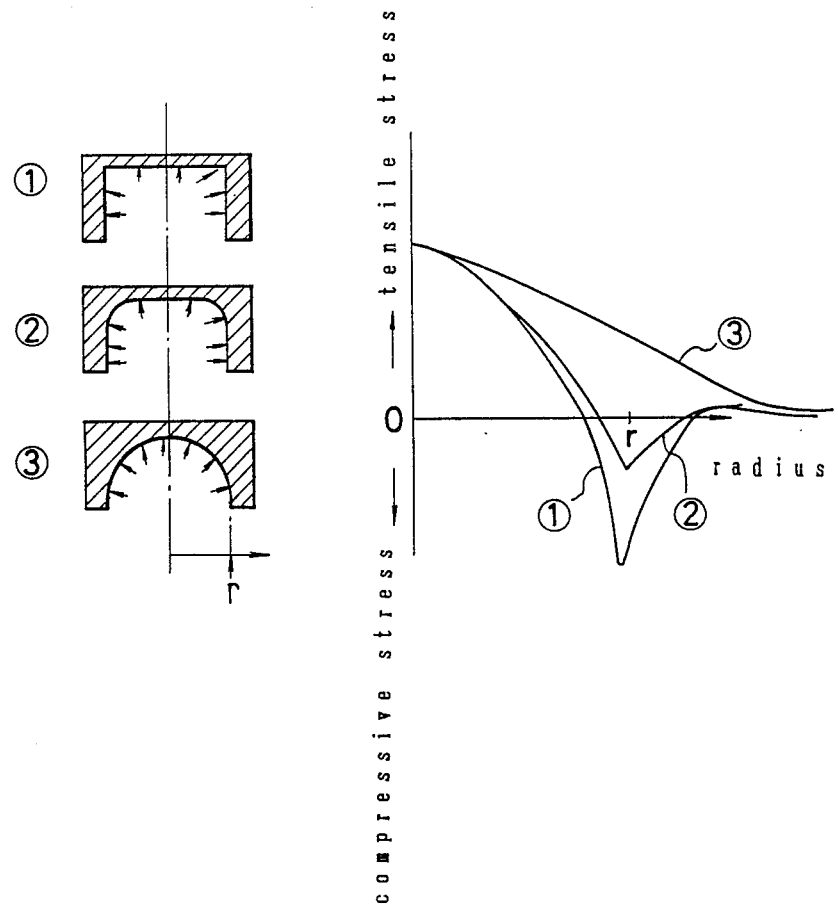
FIG. 5 shows schematic diagrams and a graph showing the relations of the forms and surface stress of the ceramic sensor.

According to the pressure sensing transmitter 10 of the present invention, since the sensing surface 13A of the ceramic sensor 13 is formed with a semi-spherical surface form as aforementioned, only a tensile stress occurs at the sensing surface projection area 13C in its sintering surface 13. That is, when the sensing surface 13A of the ceramic sensor 13 is varied as shown by ① to ③ in FIG. 5, the surface stresses of each ceramic sensor become as shown in the graph in FIG. 5. That is, when a surface stress occurs in the ceramic sensor in the case where a radius of a corner portion of the ceramic sensor is small, a tensile stress occurs at the central portion, and a compressive stress occurs at the peripheral portion. In contrast with this, when a surface stress occurs in the ceramic sensor in the case where a corner portion of the sensing surface is formed with a semi-spherical shape, only tensile stress occurs. When the tensile stress and compressive stress coexist at said sensing surface projection area 13C different from the present invention, sintering a pair of the thick film resistor members 14A and another pair of the thick film resistor members 14B which form a Wheatstone bridge circuit at said sensor surface projection area 13C is desirable to obtain a large output at the Wheatstone bridge circuit. However, according to the present invention, since only the tensile stress exists at the sensing surface projection area 13C as aforementioned, only a pair of the thick film resistor members 14A is sintered at approximately the central portion of the sensing surface projection area 13C, and another pair of the thick film resistor 30 members 14B is sintered at an external peripheral portion of the sensing surface projection area. In the case of this being done, since each of the thick film resistor members 14A and 14 is sintered at both the interior and exterior of the sensing surface projection area 13C, a sintering area of each thick film resistor members 14A and 14B become larger, and as a result, a noise of each thick film resistor members 14A and 14B is decreased less, a signal/noise ratio (SN ratio) of the output signal is higher, so that a larger output can be obtained.

Thus according to the pressure sensing transmitter 10 of the present invention, while a safety rate against the breakdown of the ceramic sensor 13 is larger, a large output can be obtained at the thick film resistor member 14 with a high degree of precision. Also, this output can be stabilized for a long time. Further, reliability is improved by carrying out an anti-destruction test, a leakage test, a pressure proof test, and the like, so that a pressure sensing transmitter for industrial use can be provided.

Thus, according to the present ivention, while the safety rate against destruction of the ceramic member is larger, a large output can be obtained at the thick film resistor member with a high degree of precision degree, and also this output can be stabilized for a long time.

What is claimed is:

1. A pressure sensing transmitter, comprising:

a housing;

a sensor base joined to said housing;

a ceramic sensor joined to said sensor base;

a thick film resistor member sintered on said ceramic sensor;

an isolation diaphragm joined to said housing and forming an isolation fluid sealing in space between said isolation diaphragm and a sensing surface of the ceramic sensor in order to isolate said isolation fluid sealing in space against a test fluid flow space; and an isolation fluid sealed into aid isolation fluid sealing in space;

said sensor base having a curved line external shape increasiing gradually in its external dimension from a housing junction edge side thereof toward the end thereof where said ceramic sensor is joined to said sensor base;

said sensor base having a solid portion having a thin external peripheral thickness portion;

said ceramic sensor being joined by a brazing material to an end surface of said ceramic sensor junction end of said sensor base;

a sensing surface of said ceramic sensor contacting with the isolation fluid in said ceramic sensor and being formed with a spherical surface form; and said thick film resistor member being sintered on a sintering surface of said ceramic surface which is opposite to the sensing surface contacting said isolation fluid in said ceramic sensor.

2. The pressure sensing transmitter of claim 1, wherein said ceramic sensor is made of an alumina oxide, said sensor base is made of titanium, and the brazing material joining said ceramic sensor to said sensor base is an active metal brazing alloy made of an aluminum, a titanium and a binder.

3. The pressure sensing transmitter of claim 2, wherein said thick film resistor member is coupled to form a part of a Wheatstone bridge circuit, a pair of said thick film resistor members forming a part of said Wheatstone bridge circuit is sintered at approximately a central portion of said sensing surface area on said sintering surface of said ceramic sensor, and another pair of said thick film resistor members is sintered at an external peripheral portion of said sensing surface area of said sintering surface of said ceramic sensor.

4. The pressure sensing transmitter of claim 1, wherein said thick film resistor member is coupled to form a part of a Wheatstone bridge circuit, a pair of said thick film resistor members forming a part of said Wheatstone bridge circuit is sintered at approximately a central portion of said sensing surface area on said sintering surface of said ceramic sensor, and another pair of said thick film resistor members is sintered at an external peripheral portion of said sensing surface area of said sintering surface of said ceramic sensor.

* * * * *